United States Patent
Wist et al.

(10) Patent No.: US 9,430,220 B2
(45) Date of Patent: Aug. 30, 2016

(54) METHOD, MEDIUM, AND APPARATUS FOR RE-PROGRAMMING FLASH MEMORY OF A COMPUTING DEVICE

(71) Applicant: GM GLOBAL TECHNOLOGY OPERATIONS LLC, Detroit, MI (US)

(72) Inventors: Alan D. Wist, Macomb, MI (US); Ansaf I. Alrabady, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 25 days.

(21) Appl. No.: 14/338,193

(22) Filed: Jul. 22, 2014

(65) Prior Publication Data

US 2016/0026458 A1    Jan. 28, 2016

(51) Int. Cl.
*G06F 9/44*    (2006.01)
*G06F 9/445*    (2006.01)

(52) U.S. Cl.
CPC ............... *G06F 8/665* (2013.01); *G06F 8/68* (2013.01)

(58) Field of Classification Search
CPC ............ G06F 8/665; G06F 8/68; G06F 8/71; G06F 12/0246; G06F 2015/766; G06F 2212/2022; G06F 2212/7206; G06F 2212/7208
USPC ........................................................ 717/168
See application file for complete search history.

(56) References Cited

U.S. PATENT DOCUMENTS

| | | | | |
|---|---|---|---|---|
| 4,956,777 A | * | 9/1990 | Cearley et al. | 701/24 |
| 5,901,330 A | * | 5/1999 | Sun | G06F 8/65 710/8 |
| 5,974,528 A | * | 10/1999 | Tsai | G06F 8/665 710/14 |
| 6,138,059 A | * | 10/2000 | Ozeki | G11C 5/14 701/1 |
| 6,505,105 B2 | * | 1/2003 | Allen et al. | 701/33.1 |
| 6,772,276 B2 | * | 8/2004 | Dover | G11C 16/102 711/103 |
| 6,775,423 B2 | * | 8/2004 | Kulkarni | G06F 8/665 382/305 |
| 6,865,736 B2 | * | 3/2005 | Holmberg et al. | 717/158 |
| 7,047,128 B2 | | 5/2006 | Dudel et al. | |
| 7,155,324 B2 | | 12/2006 | Blazic et al. | |
| 7,330,960 B2 | * | 2/2008 | Niles | G06F 3/0608 711/170 |
| 7,333,005 B2 | * | 2/2008 | Daghan et al. | 340/426.3 |

(Continued)

OTHER PUBLICATIONS

Intelligent Communication for Future Automobile Networks by Radovan Miucic Dissertation Submitted to the Graduate School of Wayne State University, Detroit, Michigan—2009.*

(Continued)

*Primary Examiner* — Francisco Aponte
(74) *Attorney, Agent, or Firm* — Ingrassia Fisher & Lorenz, P.C.

(57) ABSTRACT

A method of re-programming flash memory of a computing device is presented here. Software content having a plurality of software modules can be re-programmed by identifying, from the software modules, a first set of software modules to be programmed by delta programming and a second set of software modules to be programmed by non-delta programming. A first set of sectors of the flash memory is assigned for programming the first set of software modules, and a second set of sectors is assigned for programming the second set of software modules. At least some of the second set of sectors are designated as temporary backup memory space. The first set of sectors is programmed with the first set of software modules, using delta programming and the designated temporary backup memory space. After programming the first set of sectors, the second set of sectors is programmed with the second set of software modules, using non-delta programming.

12 Claims, 4 Drawing Sheets

(56) References Cited

U.S. PATENT DOCUMENTS

| | | | |
|---|---|---|---|
| 7,366,589 B2 | 4/2008 | Habermas | |
| 7,877,562 B2* | 1/2011 | Mukaida | 711/162 |
| 7,886,141 B2* | 2/2011 | Jan | G06F 8/665 |
| | | | 713/1 |
| 8,001,385 B2* | 8/2011 | Rudelic | 713/176 |
| 8,296,535 B2* | 10/2012 | Eker et al. | 711/162 |
| 8,341,513 B1* | 12/2012 | Lattyak et al. | 715/229 |
| 8,549,271 B1* | 10/2013 | Joshi | G06F 8/65 |
| | | | 713/1 |
| 8,650,167 B2* | 2/2014 | Sim-Tang | 707/694 |
| 8,655,541 B2* | 2/2014 | You, II | H04L 67/34 |
| | | | 340/438 |
| 8,683,206 B2 | 3/2014 | Sarkar et al. | |
| 8,688,313 B2* | 4/2014 | Margol | G06F 8/61 |
| | | | 701/31.4 |
| 8,813,061 B2* | 8/2014 | Hoffman et al. | 717/168 |
| 2004/0062130 A1* | 4/2004 | Chiang | 365/230.03 |
| 2007/0079053 A1* | 4/2007 | Sawa et al. | 711/100 |
| 2007/0101096 A1* | 5/2007 | Gorobets | 711/203 |
| 2007/0185624 A1* | 8/2007 | Duddles | G06F 8/665 |
| | | | 701/1 |
| 2007/0192532 A1* | 8/2007 | Ogle | 711/103 |
| 2008/0133823 A1* | 6/2008 | Laichinger et al. | 711/103 |
| 2008/0222368 A1* | 9/2008 | Gehrmann | 711/152 |
| 2009/0077267 A1 | 3/2009 | Alrabady et al. | |
| 2009/0113166 A1* | 4/2009 | Houston | G06F 11/1068 |
| | | | 711/216 |
| 2009/0113386 A1* | 4/2009 | Eker et al. | 717/108 |
| 2009/0204747 A1* | 8/2009 | Lavan | G06F 12/0246 |
| | | | 711/103 |
| 2009/0300275 A1* | 12/2009 | Murakami | G11C 11/413 |
| | | | 711/103 |
| 2011/0029726 A1* | 2/2011 | Fujimoto | 711/103 |
| 2013/0111212 A1 | 5/2013 | Baltes et al. | |
| 2013/0111271 A1* | 5/2013 | Baltes et al. | 714/38.1 |
| 2014/0032916 A1 | 1/2014 | Costin et al. | |
| 2014/0075094 A1 | 3/2014 | Alrabady et al. | |
| 2014/0075197 A1 | 3/2014 | Alrabady et al. | |
| 2014/0075517 A1 | 3/2014 | Alrabady et al. | |
| 2014/0281122 A1* | 9/2014 | Lieber | 711/103 |
| 2015/0006066 A1* | 1/2015 | Stevens | F02D 41/2451 |
| | | | 701/115 |
| 2015/0154086 A1* | 6/2015 | Rabeler et al. | 717/168 |

OTHER PUBLICATIONS

Remote Incremental Linking for Energy—Efficient Reprogramming of Sensor Networks; Joel Koshy and Raju Pandey—Department of Computer Science University of California—2005—IEEE.*

Efficient reprogramming of wireless sensor networks using incremental updates and data compression—Milosh Stolikj, Pieter J. L. Cuijpers, Johan J. Lukkien—Eindhoven University of Technology Department of Mathematics and Computer Science System Architecture and Networking Group—May 2012.*

* cited by examiner

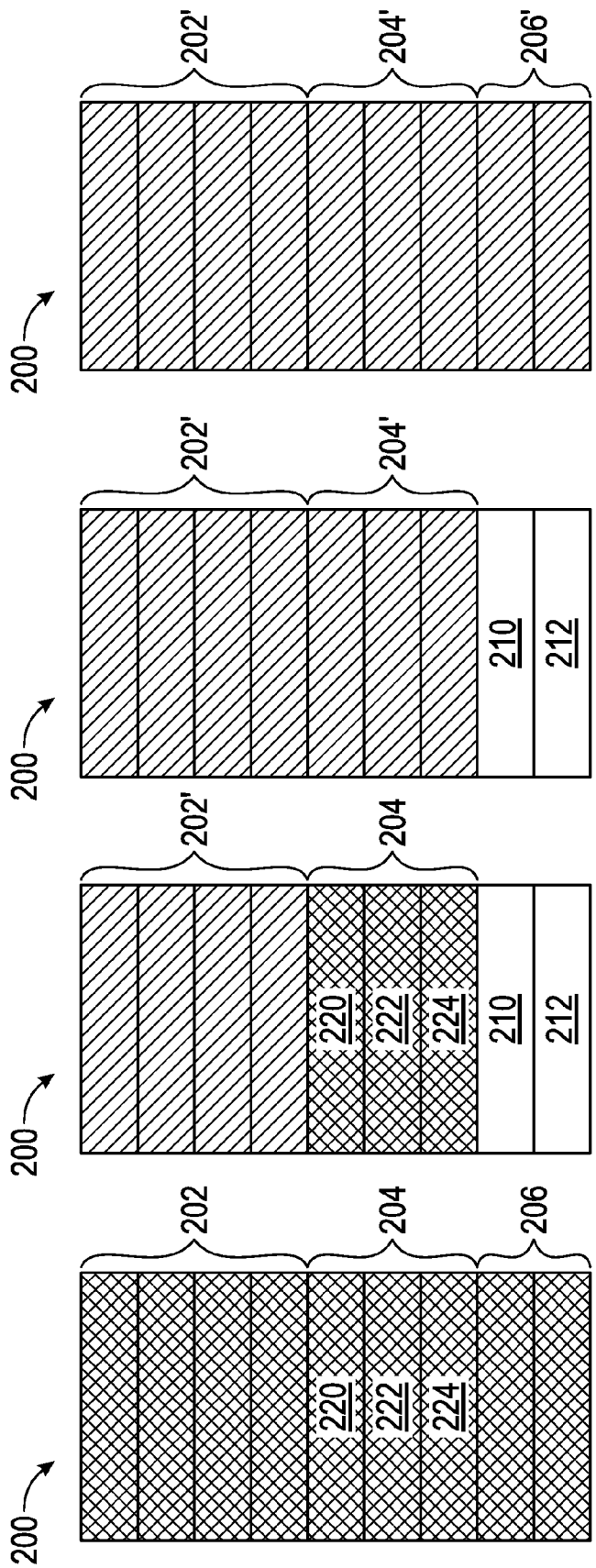

METHOD, MEDIUM, AND APPARATUS FOR RE-PROGRAMMING FLASH MEMORY OF A COMPUTING DEVICE

TECHNICAL FIELD

Embodiments of the subject matter described herein relate generally to electronic control systems and electronic control units (ECUs) of the type used in vehicles. More particularly, embodiments of the subject matter relate to programming techniques for re-programming the flash memory of ECUs.

BACKGROUND

Modern motor vehicles provide many software-controlled features or functions to accommodate the needs and desires of drivers and passengers and to comply with the regulations of governmental agencies. Such features are generally controlled by software programmed into various modules or electronic control units (ECUs) located at different places within the vehicle. The ECUs and the signal paths to and from the ECUs and the hardware devices they control can be thought of as forming a high-speed computer network that is included within the vehicle. Each ECU includes software for its particular vehicle system, such as application software to perform various control functions, and associated calibration software to configure the application software. From time to time, the ECU software is updated to reflect software improvements, to enable or disable user preferences, and/or to patch or correct the existing software. Updating the ECU software typically involves reflashing the program code stored in flash memory to replace the existing software modules with new software modules.

For various reasons, it can be burdensome for ECU suppliers to preprogram ECUs to suit the needs and specifications of the vehicle manufacturers. Accordingly, some ECU suppliers now provide the vehicle manufacturer with generically programmed ECUs, which are later re-programmed with the vehicle-unique ECU software by the vehicle manufacturer. Such re-programming may require reflashing the preexisting program code provided by the ECU suppliers.

The increasing use of ECUs and the number of software programs used by ECUs has prompted ECU vendors and vehicle manufacturers to investigate the use of efficient and economic flash programming techniques. Nonetheless, there remains a need and desire to have an improved methodology for re-programming ECUs in vehicles. Furthermore, other desirable features and characteristics will become apparent from the subsequent detailed description and the appended claims, taken in conjunction with the accompanying drawings and the foregoing technical field and background.

BRIEF SUMMARY

A method of re-programming flash memory of a computing device with software content is disclosed herein. The software content includes a plurality of software modules, and an exemplary embodiment of the method begins by identifying, from the software modules, a first set of software modules to be programmed by delta programming and a second set of software modules to be programmed by non-delta programming. The method proceeds by assigning a first set of sectors of the flash memory for programming the first set of software modules, and a second set of sectors of the flash memory for programming the second set of software modules. The method continues by designating at least some of the second set of sectors as temporary backup memory space, and by programming the first set of sectors with the first set of software modules, using delta programming and the designated temporary backup memory space. After programming the first set of sectors, the second set of sectors is programmed with the second set of software modules, using non-delta programming.

Also disclosed herein is a tangible and non-transitory computer readable medium having computer executable instructions stored thereon and capable of performing a method when executed by a processor. The method performed by the instructions identifies, from a plurality of software modules, a first set of software modules to be programmed into a flash memory by delta programming and a second set of software modules to be programmed into the flash memory by non-delta programming. A first set of sectors of the flash memory is assigned for programming the first set of software modules, and a second set of sectors of the flash memory is assigned for programming the second set of software modules. At least some of the second set of sectors are designated as temporary backup memory space. The first set of sectors is programmed with the first set of software modules, using delta programming and the designated temporary backup memory space. After programming the first set of sectors, the second set of sectors is programmed with the second set of software modules, using non-delta programming.

An electronic control unit for a vehicle is also disclosed. An exemplary embodiment of the electronic control unit includes a processor architecture having at least one processor device, a flash memory to store program code representing a plurality of software modules, and computer readable media having computer-executable instructions stored thereon. When executed by the processor architecture, the instructions cause the electronic control unit to: initiate re-programming of the flash memory with a first software module and a second software module; obtain a delta program file associated with the first software module; delta program a first set of sectors of the flash memory with the first software module, using the delta program file and using a second set of sectors allocated for the second software module as temporary backup memory space; and after delta programming the first set of sectors, program the second set of sectors with the second software module, using non-delta programming.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a diagram of a flash memory element programmed with existing software modules;

FIG. 3 is a diagram of the flash memory element shown in FIG. 2, depicted in a state during a reflashing operation;

FIG. 4 is a diagram of the flash memory element shown in FIG. 2, depicted in a state near the end of a reflashing operation;

FIG. 5 is a diagram of the flash memory element shown in FIG. 2 after completion of a reflashing operation;

DETAILED DESCRIPTION

Figure 1:
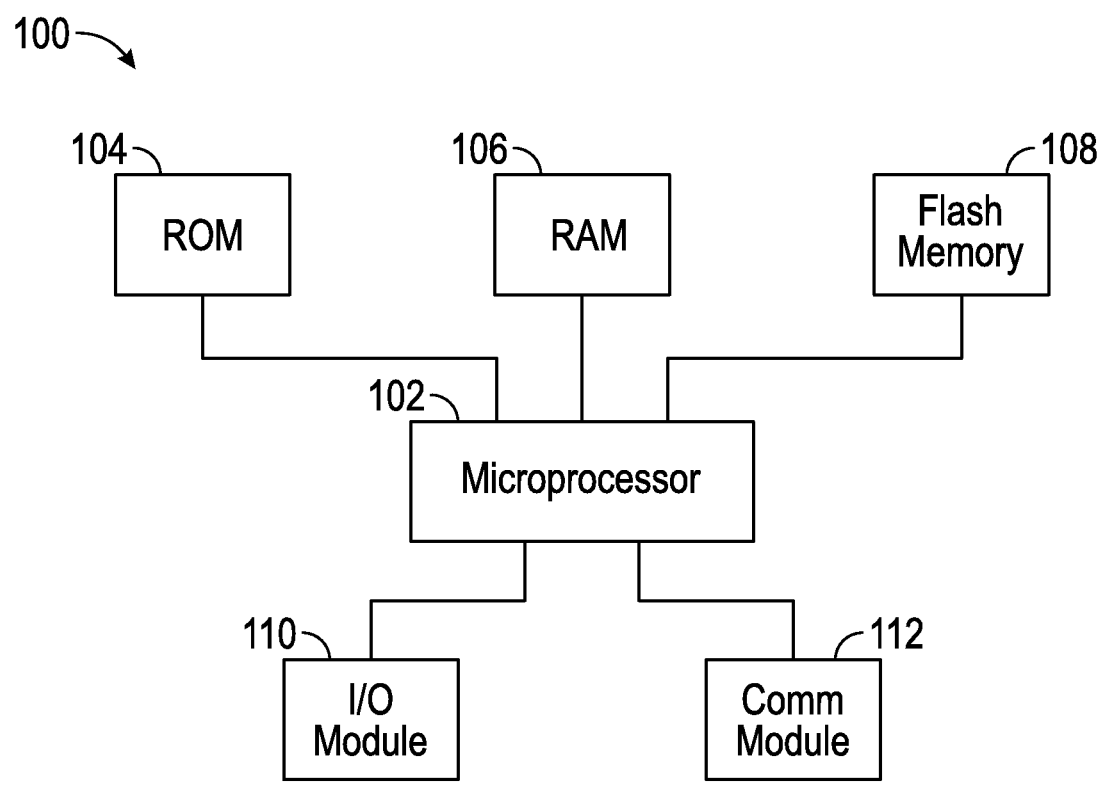
FIG. 1 is a simplified schematic representation of an ECU that is suitable for use in a vehicle.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, processor-executed, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or executable instructions that, when executed by one or more processor devices, cause the host computing system to perform the various tasks. In certain embodiments, the program or code segments are stored in a tangible processor-readable medium, which may include any tangible medium that can store or transfer information. Examples of suitable forms of non-transitory, tangible, and processor-readable media include an electronic circuit, a semiconductor memory device, a ROM, a flash memory, an erasable ROM (EROM), a floppy diskette, a CD-ROM, an optical disk, a hard disk, or the like.

The techniques and technologies described here can be deployed with any vehicle, including, without limitation: road vehicles such as cars, buses, trucks, and motorcycles; aircraft; watercraft; spacecraft; trains; subways; specialty equipment (e.g., construction equipment, factory equipment, etc.); trams; and the like. The particular embodiments described below relate to vehicle applications, however, the subject matter is not limited or restricted to such vehicle applications.

The subject matter described here relates to an efficient and cost-effective flash programming technique that utilizes delta programming to store program code in the flash memory element of an ECU of a vehicle. Delta programming can be performed in a failsafe manner without significantly increasing ECU cost or complexity. As is well understood by those familiar with software programming, and flash memory architectures, delta programming is an efficient way of updating, changing, or revising existing software content, which may represent program code, calibration data, or the like. In this regard, delta programming focuses on the differences between existing (pre-programmed) software content and new software content that is intended for installation. In accordance with delta programming techniques, a delta program file can be created to represent the differences between two software versions. Thus, the new software content in its entirety need not be sent to the target ECU. Consequently, if only minor changes are needed, then delta programming can result in less overhead, and quick installation.

Delta programming can be performed in a failsafe manner to ensure that programming interruptions do not result in an unrecoverable state. To this end, conventional delta programming techniques may utilize additional nonvolatile memory (e.g., flash memory) that is only used during programming (i.e., the additional memory is not used during normal operation of the ECU after reflashing). Depending on the update strategy, the additional memory may be used as a backup area to store some of the previous version of the software content, as a scratchpad to store the currently reconstructed flash sectors, or as a temporary area to store the update and status information while the new version is being written to the flash memory. Thus, the previous version of the software content can be recovered if needed. Although this approach is effective, it increases the cost and complexity of the ECU.

The technique presented here employs delta programming in a failsafe manner without significantly increasing ECU cost or complexity. As described in more detail below, the desired software content is divided into identifiable software modules. Some of the software modules are re-programmed using delta programming. Thereafter, one or more remaining software modules are re-programmed using a traditional or non-delta methodology. During the delta programming phase, a portion of the flash memory that is reserved for the non-delta programming modules is used as a temporary buffer when constructing the final image for the modules that are updated during this phase. During the non-delta programming phase, the reserved flash sectors are written with the remaining software module(s) using traditional techniques (e.g., raw binary, compressed image, or the like).

FIG. 1 is a simplified schematic representation of an ECU 100 that is suitable for use in a vehicle. Modern vehicles may include multiple ECUs 100, each suitably configured to perform certain designated functions and operations onboard the vehicle. The illustrated embodiment of the ECU 100 generally includes, without limitation: a processor architecture having at least one processor device (such as a microprocessor 102); read-only memory 104; random access memory 106; flash memory 108; an input/output module 110; and a communication module 112. In practice, the ECU 100 may include additional elements, devices, and functional modules that cooperate to achieve the desired functionality.

The processor architecture of the ECU 100 is capable of executing program code instructions that cause the ECU 100 to perform a variety of techniques, operations, and functions, including those described in more detail below. Although FIG. 1 depicts a microprocessor 102, which is a preferred implementation, the ECU 100 may employ any number of discrete processor devices, content addressable memory, digital signal processors, application specific integrated circuits, field programmable gate arrays, any suitable programmable logic device, discrete gate or transistor logic, discrete hardware components, or any combination designed to perform the functions described here. Moreover, a processor device utilized by the ECU 100 may be implemented as a combination of devices, e.g., a combination of a digital signal processor and a microprocessor, a plurality of microprocessors, one or more microprocessors in conjunction with a digital signal processor core, or any other such configuration.

The ROM 104 and the flash memory 108 may be used to store computer-executable program code that represents or defines the various software modules for the ECU 100. The ROM 104 may be used in some embodiments where the software modules stored therein need not be updated or revised. For example, the ROM 104 may be utilized to store program code that defines an operating system, a boot loader, or a BIOS for the ECU 100. In contrast, the software modules stored in the flash memory 108 are subject to re-programming (reflashing) as needed. Indeed, the re-programming methodology described below can be performed to write new software modules to the flash memory 108. The RAM 106 serves as temporary data storage for the microprocessor 102. In this regard, the microprocessor 102 can write to and read from the RAM 106 as needed to support the operation of the ECU 100.

The input/output module 110 may be realized with software, firmware, hardware, processing logic, or any combination thereof. The input/output module 110 may be responsible for collecting sensor data, issuing control commands or instructions, and the like. The communication module 112 may also be realized using software, firmware, hardware, processing logic, or any suitable combination thereof. In certain exemplary embodiments, the communication module 112 is suitably configured to support data communication between the ECU 100 and other modules, ECUs, or devices onboard the host vehicle. The communication module 112 may also be designed to support data communication with external devices or sources. For example, the communication module 112 may include or cooperate with a port or an interface that accommodates wired or wireless connection with an external computing device, such as a laptop computer or a vehicle diagnostics system. As another example, the communication module 112 may support cellular data communication, satellite data communication, or the like.

As mentioned above, an efficient and quick re-programming methodology can be used to reflash a flash memory element of an ECU. In this regard, FIG. 2 is a diagram of a flash memory element 200 that is already programmed with existing software modules. For this particular example, the flash memory element 200 is divided into nine flash sectors (depicted as horizontally arranged rectangles), although an embodiment of the flash memory element 200 may include any number of flash sectors as appropriate for the particular application, platform, and ECU functionality. The dark shading in FIG. 2 indicates that all nine of the flash sectors have already been written with program code. As used herein, a "flash sector" represents an erasable portion of memory. In accordance with conventional flash memory technology, data is erased on a sector-by-sector basis; all the memory cells in a flash sector must be erased together. In certain embodiments, the flash memory element 200 is divided into flash sectors of the same size (e.g., 8 kB, 64 kB, or 256 kB per sector). In other embodiments, the flash memory element 200 may be divided into flash sectors of more than one size.

The flash memory element 200 can be programmed with any number of software modules (i.e., pieces of computer-executable program code), depending on the overall capacity of the flash memory element 200, the individual sizes of the software modules, and possibly other factors. The non-limiting and simple example described here assumes that the flash memory element 200 is used to store an application software module 202, a first program calibration module 204 that is associated with the application software module 202, and a second program calibration module 206 that is also associated with the application software module 202. As depicted in FIG. 2, the application software module 202 occupies four of the nine flash sectors, the first program calibration module 204 occupies three of the nine flash sectors, and the second program calibration module 206 occupies the remaining two of the nine flash sectors. The particular arrangement and allocation of flash sectors shown in FIG. 2 are merely intended to serve as one simple example. In practice, the number of flash sectors assigned to each software module can vary as needed to accommodate the actual size of the module. Accordingly, one or more flash sectors may be used to store the program code for each software module of the ECU.

FIG. 3 is a diagram of the flash memory element 200 during a reflashing operation, FIG. 4 is a diagram of the flash memory element 200 near the end of the reflashing operation, and FIG. 5 is a diagram of the flash memory element 200 after completion of the reflashing operation. The progression depicted in FIGS. 2-5 will be explained in more detail below with reference to FIG. 7.

Figure 6:
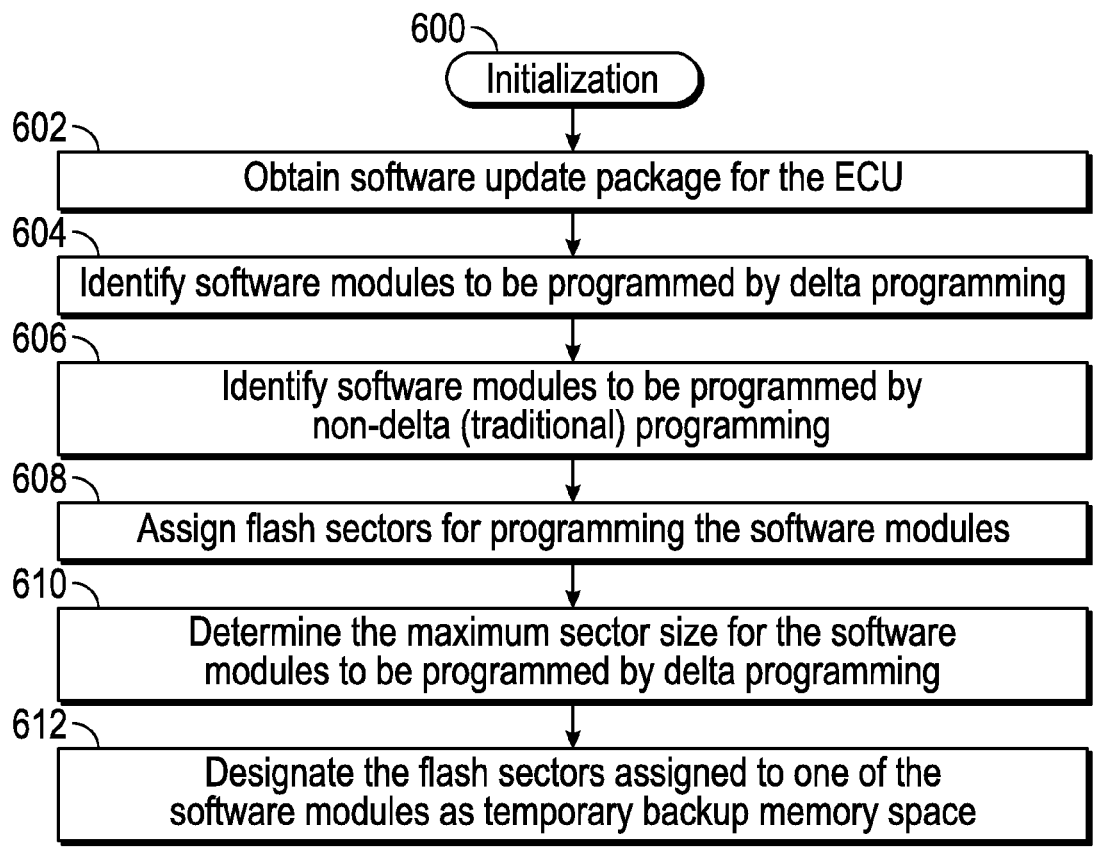
FIG. 6 is a flow chart that illustrates an exemplary embodiment of an initialization process associated with a flash re-programming operation.

FIG. 6 is a flow chart that illustrates an exemplary embodiment of an initialization process 600 associated with a flash re-programming operation. The various tasks performed in connection with the process 600 may be performed by software, hardware, firmware, or any combination thereof. The process 600 (or portions thereof) may be performed by the ECU (e.g., by the boot loader) and/or by another subsystem or device onboard the host vehicle. Alternatively, some or all of the process 600 could be performed by a subsystem or service that is external to the host vehicle, such as an external computing device, diagnostic equipment, or a cloud-based software updating service. It should be appreciated that the process 600 may include any number of additional or alternative tasks, the tasks shown in FIG. 6 need not be performed in the illustrated order, and the process 600 may be incorporated into a more comprehensive procedure or process having additional functionality not described in detail herein. Moreover, one or more of the tasks shown in FIG. 6 could be omitted from an embodiment of the process 600 as long as the intended overall functionality remains intact.

The process 600 assumes that the flash memory has already been programmed and, therefore, has existing software modules resident in at least some of its flash sectors. In accordance with this example, the process 600 obtains a software update package for the ECU (task 602). The update package may be obtained from any authorized source, and it may be delivered to the ECU in any practical format. For example, the update package may be obtained over the air from an external source to update the existing software image of the flash memory. The software update package contains the information and data that is needed to re-program the flash memory in the manner specified herein. In this regard, the software update package may include, without limitation: an identifier or address of the target ECU; at least one delta program file to be used during delta programming of one or more software modules; and new program code to be used during non-delta programming of one or more software modules. The delta program file (or files) represents the difference between an existing set of software modules (i.e., one or more modules) that currently resides in the flash memory, and the "updated" or "new" version of that set of software modules. Notably, the delta program file(s) only refers to those software modules that are to be re-programmed using the delta programming technique. In contrast, the additional new program code represents the "updated" or "new" version of a set of software modules that are to be re-programmed using a traditional (non-delta) programming approach. Thus, the new program code may represent an updated software module in its entirety, as a compressed or non-compressed image.

It should be appreciated that a plurality of delta program files could be provided for purposes of updating application software and/or calibration data. Moreover, any number of software modules could be programmed using a traditional non-delta programming technique. For example, with reference to FIG. 2, the application software module 202 could be updated using a single delta program file, and the flash sectors 220, 222, 224 (used for the program calibration module 204) could be updated using a plurality of delta program files. Similarly, the flash sectors 210, 212 (used for the calibration module 206) could be updated using one or more delta program files. These examples are not intended to be limiting or otherwise restrictive of the technology described here. Rather, the process 600 can be flexibly designed to handle the updated software content regardless of the delivery mechanism.

The process 600 identifies the set of software modules to be programmed by delta programming (task 604), and identifies the set of software modules to be programmed by non-delta programming (task 606). Referring again to FIG. 2, the example described here assumes that the application software module 202 and the first program calibration module 204 will be reflashed by a delta programming technique, and that the second program calibration module 206 will be reflashed by a non-delta (traditional) programming technique. The process 600 assigns a first set of sectors (i.e., one or more) of the flash memory for purposes of delta programming, and assigns a second set of sectors (i.e., one or more) of the flash memory for purposes of non-delta programming (task 608). For the example shown in FIG. 2: the upper four flash sectors are assigned for delta programming of the application software module 202; the fifth, sixth, and seventh flash sectors are assigned for delta programming of the first program calibration module 204; and the lower two flash sectors are assigned for non-delta programming of the second program calibration module 206.

In conjunction with the assignment of sectors (task 608), the process 600 may also determine the maximum sector size to be programmed using the delta programming technique (task 610). This determination is important to enable the process 600 to allocate an amount of the flash memory equal to at least the maximum sector size for use as temporary backup memory space. If different sector sizes are used in the flash memory, then more than one sector may need to be designated for use as the temporary backup memory space. This practical requirement ensures that the existing (old) content of the largest sector can be saved in the temporary backup memory space as a failsafe measure during the delta programming.

In this manner, the process 600 allocates and designates at least some of the sectors to be used during the non-delta programming as the temporary backup memory space (task 612). For the flash memory element 200 depicted in FIG. 2, this example reserves the lower two flash sectors for use as the temporary backup memory space. In other words, the sectors used for the existing version of the second program calibration module 206 are designated for use as buffer memory during the delta programming of the application software module 202 and the first program calibration module 204. It should be understood that some or all of the tasks described above for the initialization process 600 could be performed "automatically" or otherwise in conjunction with the re-programming of the flash memory. The process 600 is described here for ease of understanding and to explain the manner in which the flash sectors are allocated and utilized.

Figure 7:
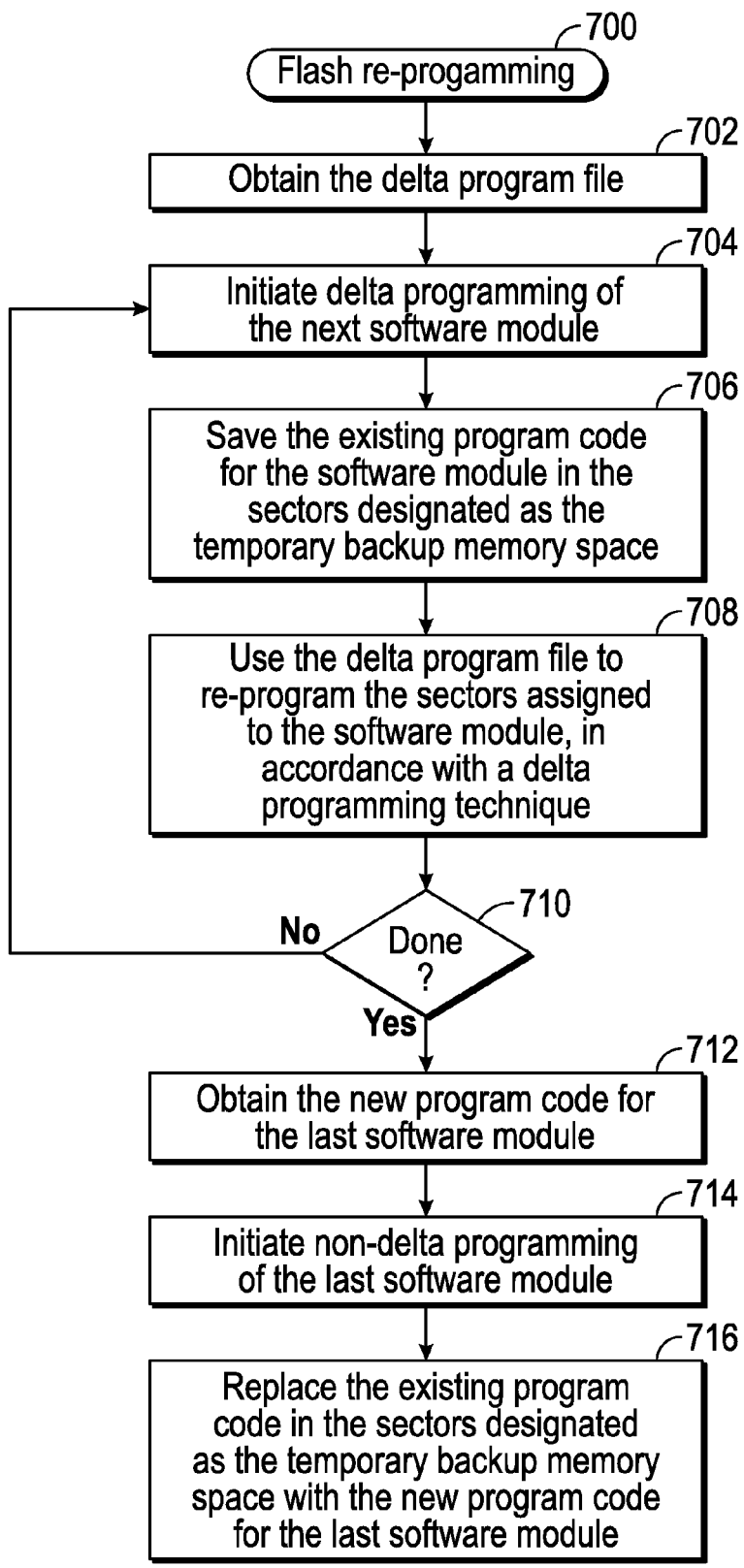
FIG. 7 is a flow chart that illustrates an exemplary embodiment of a flash re-programming process.

FIG. 7 is a flow chart that illustrates an exemplary embodiment of a flash re-programming process 700. The various tasks performed in connection with the process 700 may be performed by software, hardware, firmware, or any combination thereof. The process 700 (or portions thereof) may be performed by the ECU (e.g., by the boot loader) to replace existing program code with updated or new program code. It should be appreciated that the process 700 may include any number of additional or alternative tasks, the tasks shown in FIG. 7 need not be performed in the illustrated order, and the process 700 may be incorporated into a more comprehensive procedure or process having additional functionality not described in detail herein. Moreover, one or more of the tasks shown in FIG. 7 could be omitted from an embodiment of the process 700 as long as the intended overall functionality remains intact.

This example assumes that a flash memory element needs to be reflashed with at least two software modules, such that the first module can be reflashed using a delta programming technique and the second module can be reflashed in a traditional "complete program code" manner. Thus, the process 700 may begin by obtaining the delta program file that is needed to accomplish the delta programming phase (task 702). As mentioned above, the delta program file may be downloaded over the air, obtained from an external computing device, or the like. The process 700 may continue by initiating delta programming of the first software module (task 704). Although the specific location of the flash sectors used for programming the first software module may vary from one embodiment to another, the example illustrated in FIGS. 2-5 uses the upper four flash sectors for this purpose.

To support a failsafe programming operation, the process 700 saves or copies at least some of the program code of the existing version of the first software module to the flash sectors that have been designated for use as the temporary backup memory space (task 706). In addition, the delta program file is used re-program the sectors that are assigned to the first software module (task 708). Referring to FIG. 3, the two flash sectors 210, 212 are used as the temporary backup memory space during the delta programming phase. Consequently, the original version of the second program calibration module 206 is erased from the flash sectors 210, 212. In accordance with the exemplary embodiment described here, delta programming is performed on a sector-by-sector basis. Thus, the existing content (program code for the software module being reflashed) in one flash sector is copied to the temporary backup memory space before that flash sector is erased and re-programmed with the new program code. This failsafe technique ensures that the old program code for each flash sector is preserved in a recoverable form. After successfully reflashing a sector, the content of the temporary backup memory space can be erased as needed.

FIG. 3 is a diagram of the flash memory element 200 after the application software module 202 has been successfully re-programmed into a new version of the application software module 202' (the prime notation indicates a reflashed version). As mentioned above, the application software module 202 is re-programmed one sector at a time, using the delta program file and the temporary backup memory space as needed. FIG. 3 depicts a moment in time when the existing version of the first program calibration module 204 still resides in the three flash sectors 220, 222, 224.

Referring back to FIG. 7, if the delta programming phase is done (the "Yes" branch of query task 710), then the process 700 continues to the non-delta programming phase. If, however, more software modules are to be reflashed using the delta programming technique (the "No" branch of query task 710), then the process 700 may return to task 704 to initiate and perform delta programming on the next software module in the manner described above. This example assumes that delta programming is repeated as needed until all of the software modules designated for delta programming have been reflashed. In this regard, FIG. 4 shows the flash memory element 200 after the first program calibration module 204 has been successfully re-programmed into a new version of the first program calibration module 204'. At the point in time depicted in FIG. 4, the two flash sectors 210, 212 may be void of content (i.e., erased) or they may contain backup program code saved during the last delta programming iteration. In other words, the flash sectors 210, 212 have not yet been re-programmed with the desired new program code.

After completion of the delta programming phase, the process 700 obtains the new program code (e.g., a compressed file or a non-compressed file) for reflashing one or more final software modules (task 712). This example assumes that only one software module remains for non-delta programming, namely, the second program calibration module 206 (see FIG. 2). In contrast to a delta program file that is used for delta programming, the obtained program code file is a full version of the software needed to completely define the final software module(s). The process 700 may continue by initiating non-delta programming of the last software module (task 714). Although the specific location of the flash sectors used for programming the last software module may vary from one embodiment to another, the example illustrated in FIGS. 2-5 uses the lowermost flash sectors for this purpose.

In accordance with the non-delta reflashing technique, the flash sectors that had been used as the temporary backup memory space are programmed with the new program code to implement the last software module (task 716). The new program code need not be copied for failsafe purposes because a traditional non-delta approach is used to write the new program code into the flash memory. For the example presented here, the existing or old program code (that was previously stored in the flash sectors 210, 212) is replaced with the program code for the second program calibration module. FIG. 5 shows the flash memory element 200 after the second program calibration module 206 has been successfully re-programmed into a new version of the second program calibration module 206'. FIG. 5 depicts the flash memory element 200 after successful reflashing. Notably, the lower two flash sectors are no longer needed or used as temporary backup memory because the delta programming phase has already been executed. Accordingly, the lower two flash sectors now contain program code associated with the second program calibration module.

The example presented above assumes that the delta programming phase is performed and completed before the non-delta programming phase. In certain embodiments, however, the flash memory element can be re-programmed in different ways. For example, it may be desirable in some situations to reflash one or more modules in a traditional way before initiating the delta programming phase. As another example, it may be desirable to alternate between multiple delta and non-delta programming phases, ending with a non-delta programming phase. These and other variations are contemplated by this disclosure.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of re-programming flash memory of a computing device with software content comprising a plurality of software modules, the method comprising:

identifying, from the plurality of software modules, a first set of software modules to be programmed by delta programming and a second set of software modules to be programmed by non-delta programming;

assigning a first set of sectors of the flash memory for re-programming with the first set of software modules using delta programming, and a second set of sectors of the flash memory for re-programming with the second set of software modules using non-delta programming, wherein each of the first set of sectors and the second set of sectors is already programmed with existing software modules;

determining a maximum sector size to be programmed using delta programming;

designating at least some of the second set of sectors as temporary backup memory space, wherein the designating includes allocating an amount of the flash memory equal to at least the maximum sector size for use as the temporary backup memory space;

copying at least some program code of the existing software modules from the first set of sectors to the designated temporary backup memory space;

after the copying, re-programming the first set of sectors with the first set of software modules, using delta programming and using the designated temporary backup memory space to preserve the copied program code of the existing software modules in a recoverable form during the re-programming of the first set of sectors; and after re-programming the first set of sectors, re-programming the second set of sectors with the second set of software modules, using non-delta programming, wherein re-programming the second set of sectors replaces the copied program code of the existing software modules with new program code that represents the second set of software modules.

2. The method of claim 1, further comprising:
obtaining a delta program file that represents a difference between an existing set of software modules in the first set of sectors and the first set of software modules, wherein re-programming the first set of sectors uses the delta program file.

3. The method of claim 1, wherein:
the computing device is an electronic control unit of a vehicle; and
the plurality of software modules comprises an application software module and a program calibration module associated with the application software module.

4. A non-transitory computer readable medium having computer executable instructions stored thereon and capable of performing a method when executed by a processor, the method comprising:
identifying, from a plurality of software modules, a first set of software modules to be programmed into a flash memory by delta programming and a second set of software modules to be programmed into the flash memory by non-delta programming;
assigning a first set of sectors of the flash memory for re-programming with the first set of software modules using delta programming, and a second set of sectors of the flash memory for re-programming with the second set of software modules using non-delta programming, wherein each of the first set of sectors and the second set of sectors is already programmed with existing software modules;
determining a maximum sector size to be programmed using delta programming;
designating at least some of the second set of sectors as temporary backup memory space, wherein the designating includes allocating an amount of the flash memory equal to at least the maximum sector size for use as the temporary backup memory space;
copying at least some program code of the existing software modules from the first set of sectors to the designated temporary backup memory space;
after the copying, re-programming the first set of sectors with the first set of software modules, using delta programming and using the designated temporary backup memory space to preserve the copied program code of the existing software modules in a recoverable form during the re-programming of the first set of sectors; and
after re-programming the first set of sectors, re-programming the second set of sectors with the second set of software modules, using non-delta programming, wherein re-programming the second set of sectors replaces the copied program code of the existing software modules with new program code that represents the second set of software modules.

5. The computer readable medium of claim 4, wherein the method performed by the computer-executable instructions further comprises:
obtaining a delta program file that represents a difference between an existing set of software modules in the first set of sectors and the first set of software modules, wherein re-programming the first set of sectors uses the delta program file.

6. The computer readable medium of claim 4, wherein the plurality of software modules comprises an application software module and a program calibration module associated with the application software module.

7. An electronic control unit for a vehicle, the electronic control unit comprising:
a processor architecture having at least one processor device;
a flash memory to store program code representing a plurality of software modules; and
computer readable media having computer-executable instructions stored thereon that, when executed by the processor architecture, cause the electronic control unit to:
initiate re-programming of the flash memory with a first software module and a second software module;
obtain a delta program file associated with the first software module;
assign a first set of sectors of the flash memory for re-programming with the first software module using delta programming, and a second set of sectors of the flash memory for re-programming with the second software module using non-delta programming, wherein each of the first set of sectors and the second set of sectors is already programmed with existing software modules;
determining a maximum sector size to be programmed using delta programming;
designating at least some of the second set of sectors as temporary backup memory space, wherein the designating includes allocating an amount of the flash memory equal to at least the maximum sector size for use as the temporary backup memory space;
copy program code of the existing software modules from the first set of sectors to the second set of sectors;
after the copying, delta program the first set of sectors of the flash memory with the first software module, using the delta program file and using the second set of sectors as the temporary backup memory space to preserve the copied program code of the existing software modules in a recoverable form during delta programming of the first set of sectors; and
after delta programming the first set of sectors, program the second set of sectors with the second software module, using non-delta programming, wherein programming the second set of sectors replaces the copied program code of the existing software modules with new program code that represents the second software module.

8. The electronic control unit of claim 7, wherein:
the first software module comprises an application software module; and
the second software module comprises a calibration module associated with the application software module.

9. The electronic control module of claim 7, wherein the delta program file is obtained from an external source to update an existing software image of the flash memory.

10. The electronic control module of claim 9, wherein the delta program file represents a difference between the existing software image and the first software module.

11. The electronic control module of claim 7, wherein the computer-executable instructions cause the electronic control unit to:
obtain program code that represents the second software module in its entirety, wherein the program code is used during the non-delta programming.

12. The electronic control module of claim 11, wherein the obtained program code comprises a compressed image.

* * * * *